United States Patent
Hankel et al.

(10) Patent No.: US 7,417,403 B2
(45) Date of Patent: Aug. 26, 2008

(54) COMPARTMENT ADAPTOR ASSEMBLY FOR RECEIVING AN ALTERNATE SIZED BATTERY INTO NIGHT VISION GOGGLES

(75) Inventors: Nathaniel S. Hankel, San Diego, CA (US); Ken Jamison, Boeme, TX (US)

(73) Assignee: Nait Distributing, Inc., Boerne, TX (US)

( * ) Notice: Subject to any disclaimer, the term of this patent is extended or adjusted under 35 U.S.C. 154(b) by 0 days.

(21) Appl. No.: 11/429,652

(22) Filed: May 4, 2006

(65) Prior Publication Data

US 2007/0257637 A1    Nov. 8, 2007

(51) Int. Cl.
  *H01M 10/46* (2006.01)
(52) U.S. Cl. ..................................... 320/110
(58) Field of Classification Search ............... 320/107, 320/110, 114, 115, 116
  See application file for complete search history.

(56) References Cited

U.S. PATENT DOCUMENTS

| | | | |
|---|---|---|---|
| 2,774,142 A | 12/1956 | Lake et al. | |
| 3,922,794 A | 12/1975 | Ackerman, Jr. | |
| 3,979,848 A | 9/1976 | Ackerman, Jr. | |
| 4,114,302 A | 9/1978 | Litman | |
| 4,539,769 A | 9/1985 | Stevens et al. | |
| 4,672,194 A | 6/1987 | Kastendieck et al. | |
| 4,742,636 A | 5/1988 | Swan | |
| 5,086,566 A | 2/1992 | Klumpp | |
| 5,172,042 A * | 12/1992 | Singhal | 320/110 |
| 5,280,229 A * | 1/1994 | Faude et al. | 320/110 |
| 5,570,529 A | 11/1996 | Amelino | |
| 5,625,954 A | 5/1997 | DePaoli | |
| 5,683,831 A | 11/1997 | Baril et al. | |
| 5,742,149 A * | 4/1998 | Simpson | 320/113 |
| 5,760,953 A | 6/1998 | Task et al. | |
| 6,014,009 A * | 1/2000 | Wierzbicki et al. | 320/107 |
| 6,081,094 A | 6/2000 | Crenshaw et al. | |
| 6,194,097 B1 | 2/2001 | Nelson et al. | |
| 6,418,657 B1 | 7/2002 | Brown | |
| 6,459,176 B1 * | 10/2002 | Brockel et al. | 307/150 |
| 2003/0131518 A1 | 7/2003 | Komberger | |

(Continued)

OTHER PUBLICATIONS

Elcan Optical Technologies; Elcan Weapon Sight Mounts; OEM Mounting Solutions; www.arizonagunrunners.com; Date unknown.

(Continued)

*Primary Examiner*—Edward Tso
(74) *Attorney, Agent, or Firm*—Kammer Browning PLLC

(57) ABSTRACT

An assembly of components for modifying a battery compartment to allow the use of batteries of a size other than originally designed. The assembly includes a hollow, electrically conductive, cylindrical adaptor, a first end of which is internally threaded for attachment to the existing battery compartment and a second end of which is externally threaded for acceptance of the existing battery compartment cap. The assembly further includes a hollow, electrically insulative, cylindrical insert. The adaptor and insert each include conductive electrical elements to connect a new configuration battery positioned within the insert to the existing battery compartment and compartment cap contacts. The adaptor and insert are coaxially aligned and loosely attached together in a manner that allows free rotational movement between them about a common central axis while retaining the adaptor and insert in close association.

16 Claims, 4 Drawing Sheets

U.S. PATENT DOCUMENTS

2004/0095094 A1* 5/2004 Kubale et al. ............... 320/114
2006/0010761 A1 1/2006 Staley, III
2006/0048432 A1 3/2006 Staley, III

OTHER PUBLICATIONS

ITT Industries Engineered for life; Night Vision Goggles, Gen. 3 AN/PVS-7D (F5001 Series); 2 Pages; Copyright 2004.

* cited by examiner

COMPARTMENT ADAPTOR ASSEMBLY FOR RECEIVING AN ALTERNATE SIZED BATTERY INTO NIGHT VISION GOGGLES

BACKGROUND OF THE INVENTION

1. Field of the Invention

The present invention relates generally to battery compartment enclosures for electronic devices and the like. The present invention relates more specifically to a battery compartment modification to permit the use of an alternative type of battery in the compartment. Even more specifically the present invention relates to a retrofit, removable, adaptor assembly that extends and modifies the battery compartment of a night vision goggles device, and permits the continued use of the original battery compartment cap assembly.

2. Background of the Invention

Battery compartments for housing and connecting batteries used in powering various electronic devices such as night vision goggles, flash lights, camera light meters, etc., are well known in the art. Such battery compartment designs often include removable battery compartment caps which enable the battery or batteries contained within the compartment to be removed and replaced with new or recharged batteries.

One specific night vision device that incorporates a battery compartment that lends itself to modification to receive a preferred battery type is the AN/PVS-7B/7D night vision goggle manufactured by ITT Industries. Referring to FIG. 1A (prior art), there is shown a AN/PVS-7B/7D night vision goggle device 10 (illustrated in dotted outline form) which includes a horizontally oriented battery compartment 12, closed and covered by a removable (internally threaded) battery compartment cap 14. The battery compartment cap 14 is tethered to the night vision goggle device 10 by way of retainer strap 16. The battery compartment 12 is typically loaded with either lithium sulfur dioxide BA-5567/U batteries or two (2) AA batteries.

FIG. 1B shows in cross-section detail the typical configuration of battery compartment 12 enclosing a BA-5567/U battery 18 with battery compartment cap 14 secured in place. Electrical conductor 20 connects flat spring contact 22 (which contacts battery 18) with the electronics of the night vision goggle device 10. Tether 16 is attached to battery compartment cap 14 in such a manner as to permit easy rotation of the cap to thread onto the opening of battery compartment 12.

Efforts have been made in the past to improve the functionality of the battery compartment cap 14 but have generally not addressed modification of the battery compartment to accommodate alternate battery selections. U.S. Pat. No. 6,194,097 issued to Nelson et al. on Feb. 27, 2001 entitled Battery Compartment Cap Having an Improved Contact, assigned to ITT Manufacturing Enterprises, Inc. (the disclosure of which is incorporated herein by reference) describes an effort to improve the battery compartment cap for the night vision goggle device that is the subject of the present invention as well. Although the modification described improves the ability of the cap to maintain electrical contact with the batteries there is nothing disclosed that is directed to accommodating alternate battery choices for the device.

Although the battery compartment 12 (as shown in prior art FIGS. 1A and 1B) functions in a generally satisfactory manner, there exist certain disadvantages which reduce its utility. Battery selection is limited to two choices, either a single lithium sulfur dioxide BA-5567/U battery or two (2) AA batteries. The physical dimensions of the battery compartment were built around these two battery choices. An inability to procure either of these two battery choices, the BA-5567/U or the two AA batteries, could render the night vision goggle device inoperable or place it out of service.

Other problems with the existing design for the battery compartment and cap include concerns about misalignment of the electrical contacts when loading certain types of batteries and the excessive weight of certain types of batteries that the night vision goggle device is designed to be used with. A lithium battery, for example, will generally weigh less than the equivalent alkaline cell. The BA-5567/U batteries have a nominal weight of 16 g while the AA batteries have weights of 22 g-23 g each for a total battery weight of 44 g-46 g. The newer and now readily available CR123A battery, on the other hand, as an example of an alternate battery capable of providing the same voltage and a greater power output, has a nominal weight of 16 g-17 g.

Still another problem with the existing design concerns the expected capacity of the lithium sulfur dioxide BA-5567/U batteries or two (2) AA batteries. The BA-5567/U batteries have a nominal capacity of 0.86 AH while the AA batteries have capacities of 1.8 AH to 2.6 AH. By addressing the physical constraints of the original design, a different and more desirable battery, for example the CR123A, could be used. The CR123A has nominal 1.3 AH capacity which would extend use beyond the capacity of the BA-5567/U battery of the original design and yet would provide a much lighter weight battery at 16 g-17 g total than the AA batteries at 44 g-46 g total.

A further consideration in choosing a battery for the night vision device involves the frequent necessity of carrying spare batteries for the night vision device and the various other battery powered devices that may typically be carried. More of the various other battery powered devices (lights, electronic sights, etc.) are using the CR123A type batteries, making it desirable for the night vision device to likewise be capable of using such batteries. It would therefore be desirable if the user could either use such batteries directly within the night vision device or carry a lightweight adaptor that permitted such use. The result would be the need to carry spares of only a single type of battery rather than multiple sets of spares. As a further advantage to this approach, the user could transfer batteries from one device to another if spares were not available and the ongoing use of a particular device became urgent.

It is, therefore, a primary objective of the present invention to provide the ability to select a different battery combination to address the power output and weight issues and substantially overcome the disadvantages associated with the battery design selection and alignment of the prior art. The objective is to provide the ability to chose a more desirable "standard sized" battery for the AN/PVS-7B/7D night vision goggle system and at the same time, teach similar configurations for modifying and retrofitting other battery compartments for similar battery exchanges.

It is a further objective of the present invention to provide an apparatus for allowing the use of a more desirable battery, while at the same time not requiring permanent alteration of the base night vision goggle system. It would be worthwhile to have a modification structure that could be easily removed so as to allow the system to return to its previous use of battery choices.

It is a further objective that the above described modification structure would require a minimal number of components such that its use and/or its removal could be accomplished in the field without the need for tools to assemble or disassemble the night vision goggle system.

In particular, it is an object of the present invention to provide an adaptor assembly for the use of an alternate battery in the battery compartment of a night vision goggle system, that maintains the use of the existing battery compartment cap and cap tether. It is an object to permit placement of the adaptor assembly by opening the battery compartment (unscrewing the cap), removing the existing batteries from the night vision goggle system, replacing the existing batteries with the new battery/adaptor assembly, and then re-securing the threaded cap.

It is an object of the present invention to provide an adaptor assembly for allowing the use of an alternate battery in a night vision goggle system that is cost effective in providing a more efficient power source for the system without an excessive increase in the cost of the night vision goggle system itself.

SUMMARY OF THE INVENTION

In fulfillment of the above objectives, the present invention provides an apparatus for modifying a battery compartment to allow the use of batteries of a size other than the original design consideration. The apparatus is comprised of two primary components, the first of which is a hollow, electrically conductive, cylindrical adaptor, a first end of which is internally threaded for attachment to the existing battery compartment and a second end of which is externally threaded for acceptance of the existing battery compartment cap. This first component provides a first electrically conductive path (the negative contact, for example) to the new battery positioned within the assembly. The second primary component of the apparatus is an electrically insulative, cylindrical insert for positioning at least one battery within the existing battery compartment. This second component provides a second electrically conductive path (the positive contact, for example) through a contact element positioned at one end of the component to the new battery positioned within the assembly. The second component is coaxially aligned with and centered partially inside the first component. An attachment ring holds the hollow cylindrical adaptor of the first component in loose (rotationally free) attachment to the cylindrical insert of the second component.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE PREFERRED EMBODIMENTS

Figure 1A:
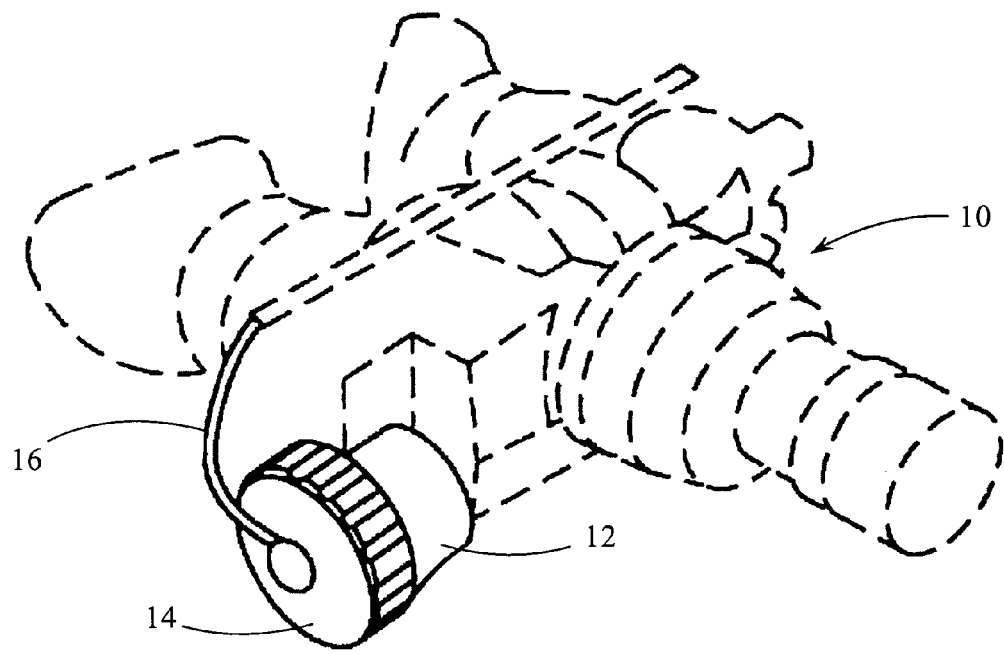
FIG. 1A (prior art) is a perspective view of an exemplary night vision device shown in dotted outline format, disclosing the position of the placement of the present invention.
Figure 1B:
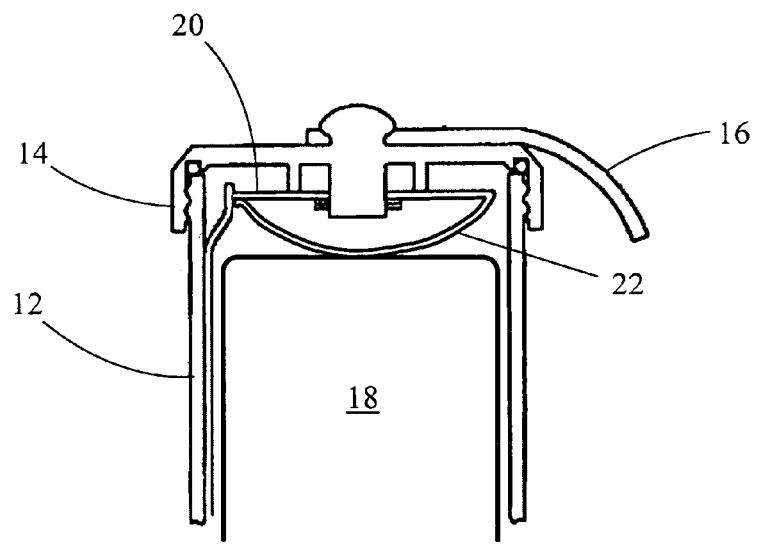
FIG. 1B (prior art) is a cross-sectional view of a prior art battery compartment cap in the closed position on the battery compartment.

Referring again to FIG. 1A (prior art), a AN/PVS-7B/7B night vision goggle device 10 (illustrated in dotted outline form) is shown to include a horizontally oriented battery compartment 12, closed and covered by a removable (internally threaded) battery compartment cap 14. The battery compartment cap 14 is tethered to the night vision goggle device 10 by way of retainer strap 16. FIG. 1B (prior art) shows in cross-sectional detail the typical configuration of battery compartment 12 enclosing a BA-5567/U battery 18 with battery compartment cap 14 secured in place. Electrical conductor 20 connects flat spring contact 22 (which contacts battery 18) with the electronics of the night vision goggle device 10. Tether 16 is attached to battery compartment cap 14 in such a manner as to permit easy rotation of the cap to thread onto the opening of battery compartment 12.

Figure 2:
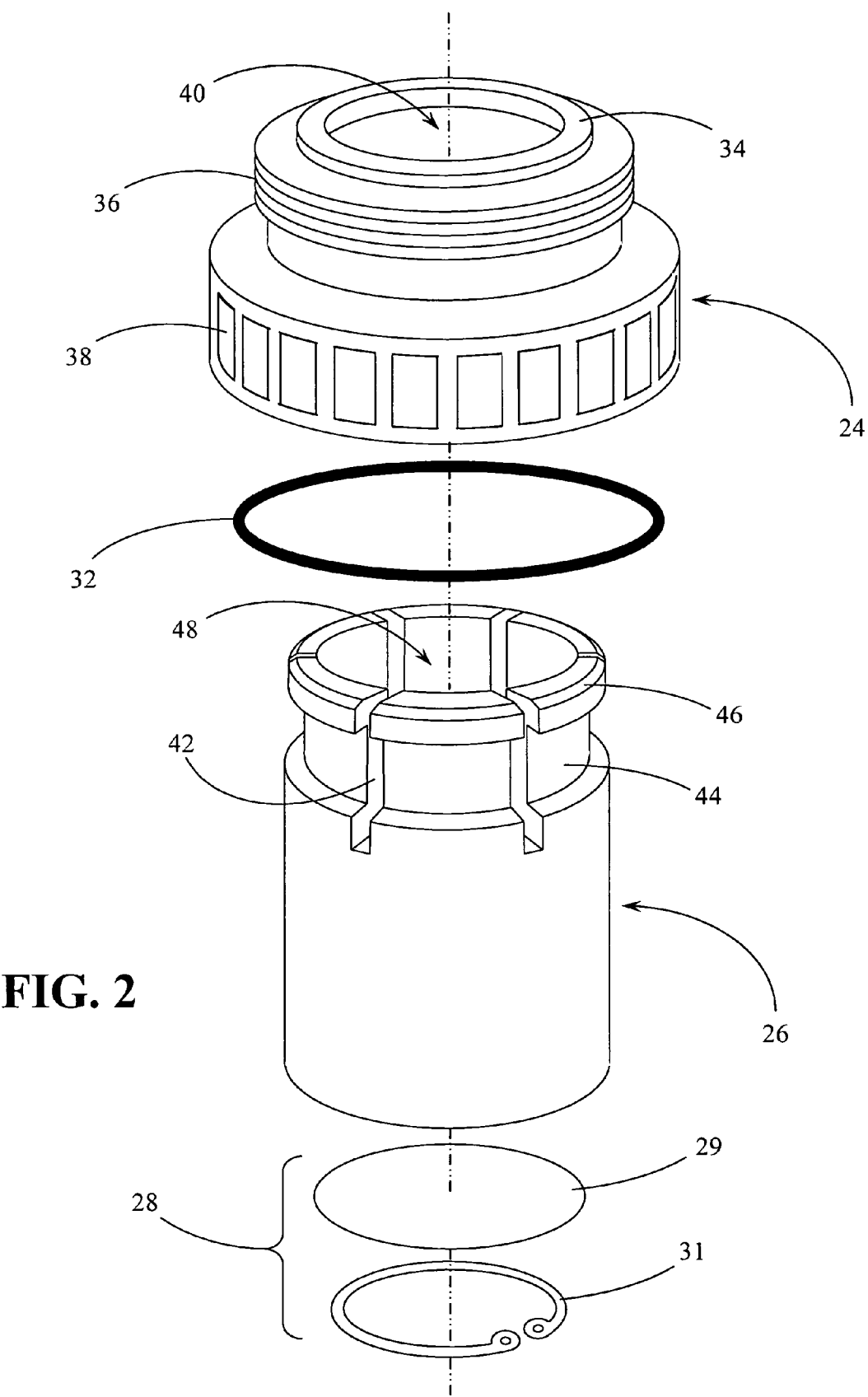
FIG. 2 is an exploded perspective view of the various components and elements of the present invention.
Figure 3:
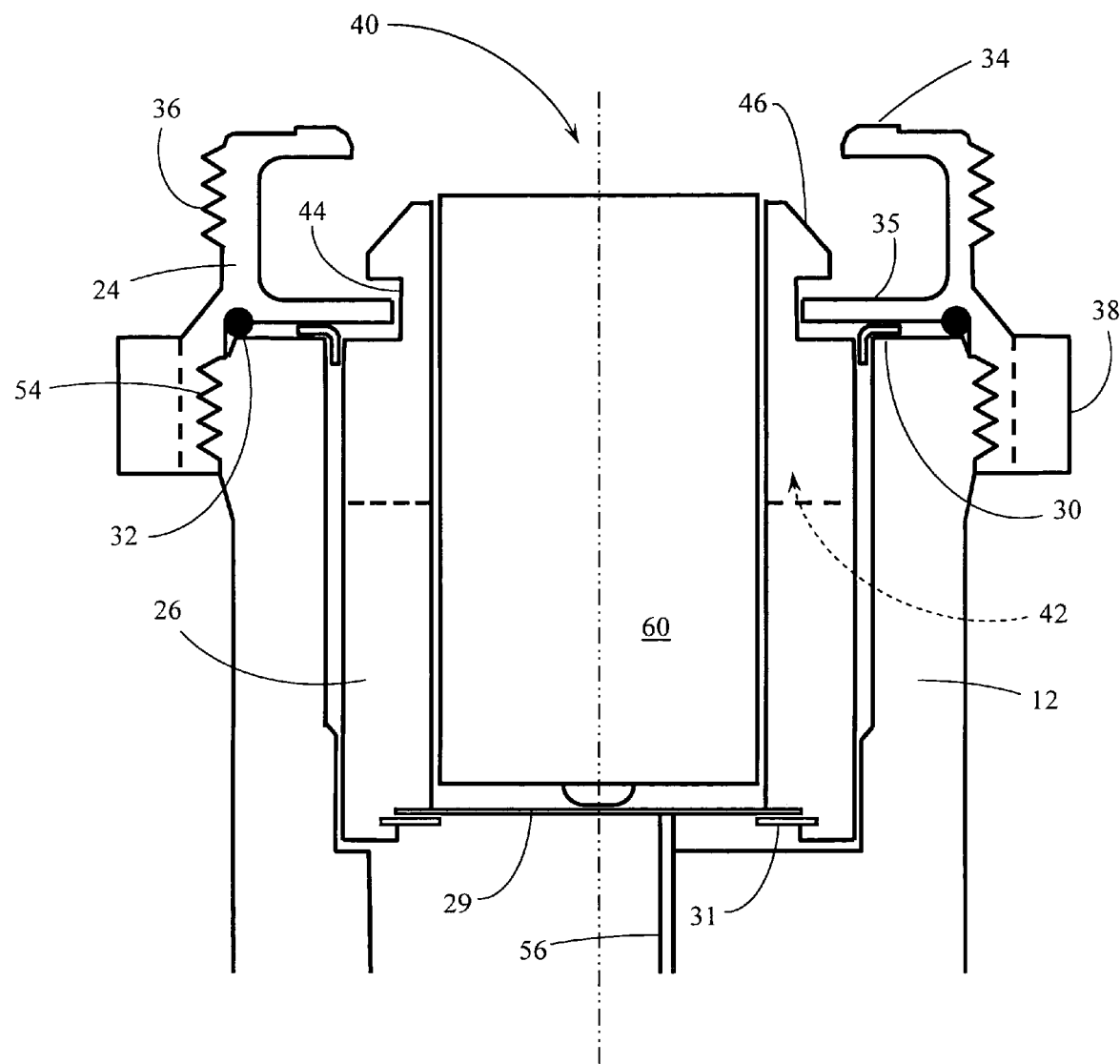
FIG. 3 is a cross-sectional view of a first preferred embodiment of the present invention positioned in place in the battery compartment of the night vision device shown in FIG. 1A.

The structure and design of the present invention is directed towards; (1) configuring the geometry of the battery compartment to appropriately enclose and hold the alternate desired battery shape and size, and (2) extending the electrical contact(s) required to connect the new battery to the electrical circuitry (wiring) of the existing battery compartment. The battery adaptor of present invention provides an "adaptor" component and an "insert" component to achieve these requirements. FIGS. 2 and 3 disclose a preferred embodiment of the present invention while FIG. 4 discloses an alternate embodiment of the invention.

Referring to FIG. 2, there is shown an exploded perspective view of the preferred embodiment of a removable battery adaptor assembly made in accordance with the objectives of the present invention. The battery adaptor assembly generally comprises a hollow cylindrical adaptor element 24, a hollow cylindrical insert 26, an O-ring 32, and a contact assembly 28. The components of the battery adaptor assembly may be manufactured from any well known conventional materials which, as described in more detail below, provide the necessary rigidity and electrical characteristics (conductive or non-conductive). For example, adaptor element 24 may be constructed from any suitable electrically conductive material such as aluminum. The cylindrical insert 26 may be manufactured from any suitable insulating material, such as high density plastic. The contact assembly 28 may be constructed from any suitable electrically conductive and physically resilient material, such as beryllium copper or stainless steel.

Adaptor element 24 is designed to attach to the existing battery compartment opening (not shown in FIG. 2) and to receive the attachment of the existing battery compartment cap (also not shown). As a result, adaptor element 24 defines a central circular opening 40 through which the existing battery contact inside the cap makes contact with the new battery inserted into the assembly of the present invention. Internal edge 34 defines this circular opening and, as described in more detail below, provides an electrical contact surface to connect with the conductive elements present in the existing battery compartment cap.

The remaining structure of adaptor element 24 comprises two sections; the externally threaded cap connector section 36 and the internally threaded battery compartment connector section 38. This combination of internally and externally threaded cylindrical sections effectively extends the battery compartment longitudinally (along the axis shown in dashed line in FIG. 2) to accommodate the new battery geometry. A new O-ring 32 is used (and positioned as shown in FIG. 3) to form a seal between the adaptor element 24 and the existing battery compartment (not shown) just as an existing O-ring in the existing battery compartment cap (not shown) accomplishes between the existing cap and the top of adaptor element 24. The section of adaptor element 24 that includes the internally threaded battery compartment connector includes gripping slots 39 to facilitate attachment and removal of the adaptor element 24 to the battery compartment housing. These gripping slots are similar to those typically positioned on the existing battery compartment cap which now (with the use of the present invention) facilitate attachment and removal of the cap to the adaptor element 24.

Cylindrical insert 26, in contrast to adaptor element 24, is preferably made of non-conductive material and serves primarily to modify the geometry of the battery chamber to accommodate the desired alternate battery size and shape. In FIG. 2, cylindrical insert 26 is shown to be a cylindrical sleeve with internal opening 48 sized to accommodate the new battery (not shown). The outward or open end of cylindrical insert 26 is configured to engage (in a manner shown in more detail below with FIG. 3) adaptor element 24. The engagement between cylindrical insert 26 and adaptor element 24 involves snapping the semi-flexible tabs 46 (formed at the upper end of insert 26 by the placement of slots 42 radially through the wall of the cylinder) into the inside of adaptor element 26. In the preferred embodiment shown, six radially arrayed slots 42 divide the upper end of the insert into six semi-flexible tabs 46 that bend slightly to allow engagement of this end of the insert 26 with an internal circular attachment ring (not shown in this view) on adaptor element 24. This internal circular attachment ring formed on the inside of adaptor element 24 engages the external circumferential slot 44 formed in cylindrical insert 26 as shown. The manner of this engagement is explained in greater detail in the cross-sectional view of FIG. 3 discussed below.

Finally in FIG. 2, the elements of the contact assembly 28 are shown positioned below the lower end of cylindrical insert 26. Contact disc 29 is held in place in the lower end of cylindrical insert 26 by retaining ring 31, which in the preferred embodiment is an inside snap ring as shown. Contact disc 29 provides the electrical connection between one of the two battery contacts (the positive contact, for example) and the appropriate circuitry (wiring) in the existing battery compartment. The manner of positioning and securing contact disc 29 into cylindrical insert 26 is described in more detail below.

Reference is now made to FIG. 3 for a description of the internal structures of the various components of the present invention, as seen in cross-sectional detail. In FIG. 3, the cross-sectional structure of cylindrical adaptor 24 is similar in some respects to the prior art battery compartment cap structures disclosed generally in FIGS. 1A and 1B. Cylindrical adaptor 24 therefore includes a circular opening 40 defined by the cylindrical wall of the adaptor 24. This cylindrical wall is slightly offset midway along its height such that the internal diameter of the lower section is approximately equal to the external diameter of the upper section. This is to simultaneously accommodate the connections to the existing cap (internally threaded) at the upper section and the existing battery compartment opening (externally threaded) at the lower section, where previously the existing cap directly connected to the existing battery compartment opening.

Interrupting the internal face of this cylindrical wall of adaptor 24 at approximately the aforementioned wall offset, is attachment ring 35 which, as described above, serves to connect adaptor 24 to insert 26 in a manner that allows them to freely rotate with respect to one another around the central axis shown in dashed line form in FIG. 3. As briefly described above, attachment ring 35 snaps into circumferential slot 44 formed at the open end of insert 26. This assembly process is made possible by the placement of radial slots 42 (dashed outline) in the open end of insert 26 to form tabs 46 which bend slightly to allow attachment ring 35 to slide into engagement with circumferential slot 44. The loose engagement between adaptor 24 and insert 26 allows the battery positioned in the present invention to be held in place between the spring-loaded electrical contact of the existing battery compartment cap (see FIG. 1B) and the contact assembly 28 positioned at the base of insert 26. The absence of rigid engagement between adaptor 24 and insert 26 allows for adaptor 24 to be screwed onto the battery compartment without rotating insert 26 and to additionally tighten when the existing battery cap is screwed onto the adaptor 24. The engagement of adaptor 24 and insert 26 also facilitates the retention of the components of the present invention together as an assembly, reducing the chance of losing one or more of the components of the assembly during battery replacement.

Positioned on an interior perimeter of the lower section of adaptor 24 is a circumferential lip configured to receive and retain O-ring 32 that seals the battery compartment adaptor 24 to the associated battery compartment 12. It should be understood, however, that other techniques for sealing the adaptor 24 to the battery compartment 12 can be used. For example, if the adaptor is manufactured from a molded plastic material (as described in more detail below) the O-ring 32 can be replaced with one or more unitarily formed sealing ribs to further reduce the assembly costs of the battery compartment enclosure.

Still referring to FIG. 3, the circumferential lip 34 positioned on adaptor 24 operates to define an electrical contact for the cylindrical adaptor 24 to complete the electrical circuit with the battery compartment contact ring 30 which, in the preferred embodiment, constitutes the negative contact conductor of the power supply for the night vision goggle. From the battery contact positioned in the existing battery compartment cap (not shown in FIG. 3) current flows into the conductive adaptor 24 by way of contact surface 34. Current from the battery then flows through adaptor 24 to contact ring 30 which is electrically connected (in a manner omitted for clarity) to the balance of the circuitry within the night vision goggle device. The positive contact, in the preferred embodiment, comprises contact assembly 28 made up of the combination of contact disc 29 and retaining ring 31. These conductors come into contact with battery compartment electrical contact 56 which extends up from within the compartment as shown and described above with respect to prior art FIG. 1B. This allows new (alternate) battery 60 to be positioned as shown within the confines of insert 26, pressed between the contact assembly 28 and the spring loaded contact in the existing battery compartment cap (not shown).

As indicated above, the second main component of the assembly of the present invention is the electrically insulated cylindrical insert 26 shown positioned within the existing battery compartment 12 in FIG. 3. The general structure of the cylindrical insert 26 is open at one end (sufficient for insertion of battery 60) and closed at the other. The closed end retains the battery 60 and in the preferred embodiment provides the electrical connection for the positive electrode of the battery to the copper contact post 56 of the night vision goggle. As described above, contact disc 29 is held in position by the insertion of retaining ring 31 snapped into place in a groove on the internal periphery of the closed end of the cylindrical insert 26. Contact disc 29 rests on a circular shelf formed in the structure of insert 26 on the internal edge of the base thereof, adjacent the above described groove into which retaining ring 31 is placed. In this manner, contact assembly 28 closes the base of insert 26 so as to enclose battery 60.

Figure 4:
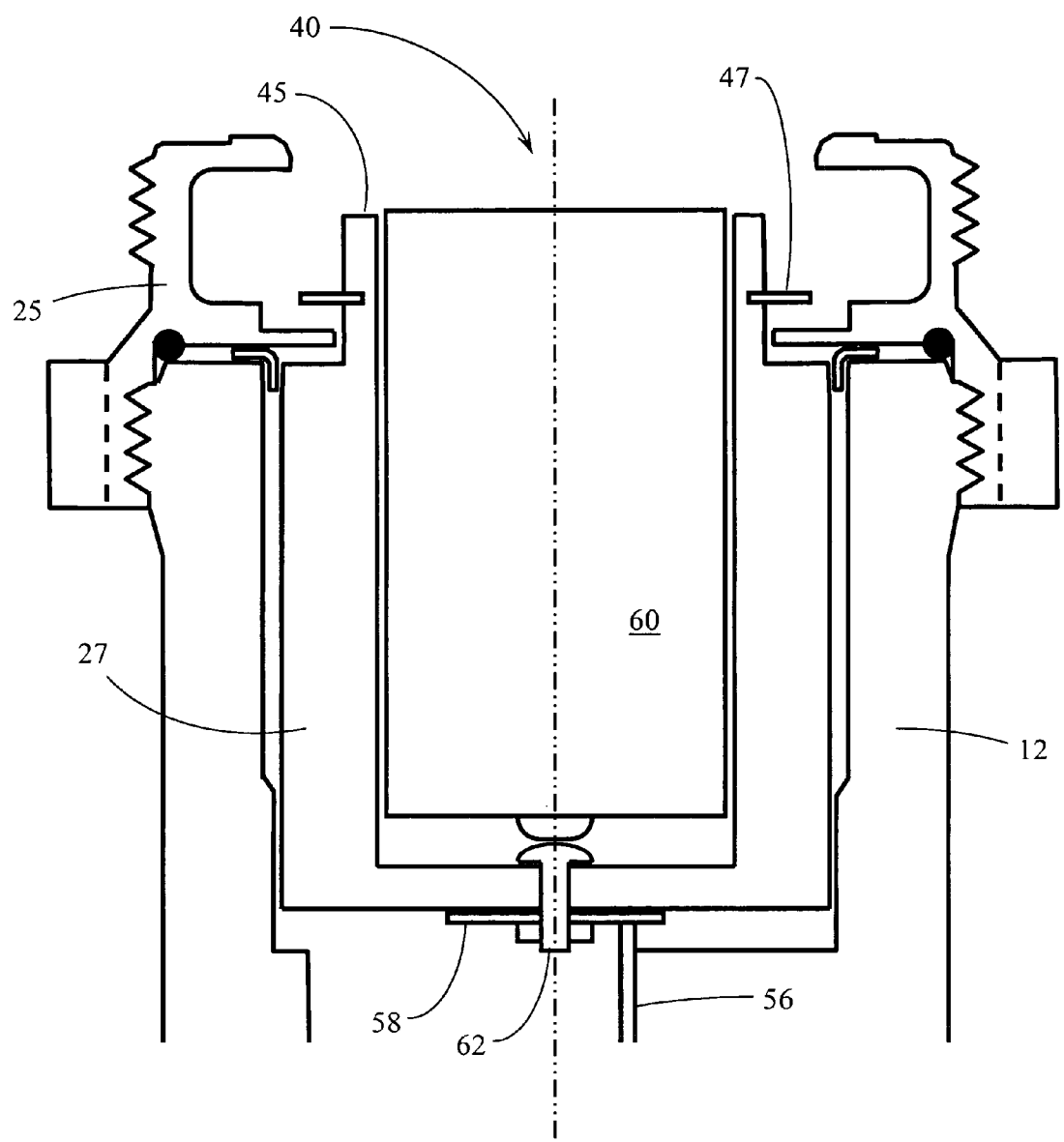
FIG. 4 is a cross-sectional view of a second preferred embodiment of the present invention positioned in place in the battery compartment of the night vision device shown in FIG. 1A.

FIG. 4 provides an alternate embodiment of the assembly of the present invention wherein each of the components is modified slightly to accommodate a different assembly process. The configuration of the open and closed ends of insert 27 is distinct from insert 26 shown in FIGS. 2 and 3. Adaptor 25 in FIG. 4 is likewise modified from adaptor 24 shown in FIGS. 2 and 3 to accommodate the modification of the open end of insert 27. In this embodiment, insert 27 is constructed with a closed base through which a narrow aperture is formed to receive a conductive screw/bolt assembly 62. Contact washer 58, which is also electrically conductive, carries current from the battery through screw/bolt assembly 62 to existing battery compartment contact post 56.

The open end of insert 27 provides a somewhat simpler means for connecting insert 27 to adaptor 25. Rather than structuring slots and tabs in the open end of insert 27, an external snap set ring 47 is simply positioned in a narrow slot on the peripheral wall 45 of this open end of the insert 27. A circular shelf is provided in adaptor 25 to receive and center the snap set ring 47. The same loose engagement between insert 27 and adaptor 25 is achieved by way of these structures which permit insert 27 to freely rotate with respect to adaptor 25 about the centerline axis shown in FIG. 4. The remaining features of the assembly of the present invention shown in FIG. 4 remain generally the same as those disclosed in FIGS. 2 and 3.

Reference is again made to FIGS. 2 and 3 for a description of an alternate embodiment of the adaptor component of the present invention. As mentioned above, it is possible for adaptor 24 to be manufactured of a molded plastic material and for the conductive path required to be provided by a conductive element integrated into or positioned on adaptor 24. One such manner of achieving a conductive path through adaptor 24 would be to mold a conductor into the material of adaptor 24 by positioning a contact ring (not shown) at contact surface 34 that, by way of an internally positioned (molded) wire connects to a similarly molded contact ring (not shown) positioned above the point of contact with contact ring 30. A similar structure could be established on the exterior surface of adaptor 24 by adhering such contact rings at the positions indicated and adhering a conductive path between them down the interior wall surface of the adaptor 24. These contact rings could be replaced by one or more discrete contact pads in further embodiments of this alternate approach to establishing the conductive path between the existing cap and the balance of the existing battery compartment.

Although the battery compartment adaptor assembly of the present invention is especially suited for use with the battery compartment of a AN/PVS-7B/7D night vision goggle device as shown and described herein, the basic structures and concepts implemented can be easily modified in size and/or shape to fit in many other applications where it is desired to utilize a more efficient or cost effective battery as a power source. It should be understood therefore that the embodiments described herein are merely exemplary and that a person skilled in the art may make many variations and modifications to the embodiments utilizing functionally equivalent elements to those described herein. Any and all such variations or modifications as well as others which may become apparent to those skilled in the art, are intended to be included within the scope of the invention as defined by the appended claims. The present invention finds specific industrial applicability in support of battery operated devices.

We claim:

1. An apparatus for modifying an existing battery compartment in a battery powered device to allow the use of at least one battery having a configuration different from that for which the battery compartment was originally designed, the existing battery compartment having an existing compartment cap, the apparatus comprising:
    a hollow cylindrical adaptor element having a first end configured for attachment to the battery compartment and a second end configured for attachment to of the compartment cap; and
    a hollow cylindrical insert externally sized to fit at least partially within the existing battery compartment and internally sized to receive the at least one new configuration battery, the insert further configured to attach to the adaptor element in loose association therewith;
    wherein the insert effectively extends the battery compartment to receive the new configuration battery and the adaptor element similarly extends the position of the compartment cap to accommodate the new configuration battery.

2. The apparatus of claim 1 wherein the existing battery compartment and existing compartment cap are each threaded as to have allowed threaded attachment one to the other, and wherein the first and second ends of the hollow cylindrical adaptor element are each similarly threaded to allow threaded attachment of the adaptor element to the existing battery compartment and threaded attachment of the existing compartment cap to the adaptor element.

3. The apparatus of claim 1 wherein the existing battery compartment and existing compartment cap each have existing electrical contacts as to have allowed electrical connection to a battery through the compartment cap, and wherein the hollow cylindrical adaptor element further comprises an electrically conductive material configured to contact and electrically connect the existing electrical contacts in the existing battery compartment and existing compartment cap.

4. The apparatus of claim 3 wherein the hollow cylindrical adaptor element is constructed of an electrically conductive material.

5. The apparatus of claim 4 wherein the electrically conductive material is selected from the group of metals comprising: aluminum, copper, brass, nickel, and stainless steel.

6. The apparatus of claim 3 wherein the hollow cylindrical adaptor element is primarily constructed of a molded plastic material and the electrically conductive material of the cylindrical adaptor element comprises a conductive element having contact surfaces proximate to the existing electrical contacts in the existing battery compartment and existing compartment cap.

7. The apparatus of claim 1 wherein the hollow cylindrical adaptor element further comprises an external gripping surface to facilitate attachment and removal of the adaptor element to the battery compartment.

8. The apparatus of claim 1 wherein the hollow cylindrical adaptor element further comprises an O-ring for sealing the attachment between the adaptor element and the battery compartment.

9. The apparatus of claim 1 wherein the existing battery compartment has at least one existing electrical contact positioned as to have allowed electrical connection to a battery placed within the battery compartment, and wherein the hollow cylindrical insert further comprises an electrically conductive element configured to contact and electrically connect the at least one existing electrical contact to the new configuration battery placed within the insert.

10. The apparatus of claim 9 wherein the electrically conductive element of the insert comprises a contact disc positioned at an inside end of the insert and positioned to contact one electrode of the new configuration battery interior to the insert and to contact the at least one existing electrical contact inside of the existing battery compartment exterior to the insert.

11. The apparatus of claim 10 wherein the contact disc is retained at the inside end of the insert by a set ring positioned adjacent the contact disc in an internal circular groove in the hollow cylindrical insert.

12. The apparatus of claim 9 wherein the electrically conductive element of the insert comprises a screw/washer/nut assembly positioned through an aperture at the inside end of the insert and positioned to contact one electrode of the new configuration battery interior to the insert and to contact the at least one existing electrical contact inside of the existing battery compartment exterior to the insert.

13. The apparatus of claim 1 wherein the hollow cylindrical adaptor element further comprises an internal circumferential ridge and the hollow cylindrical insert further comprises an external circumferential slot on an outside end of the insert, and the attachment of the insert to the adaptor element in loose association comprises positioning the outside end of the insert inside the adaptor element such that the circumferential slot of the insert receives and retains the circumferential ridge of the adaptor element.

14. The apparatus of claim 13 wherein the outside end of the insert comprises a plurality of tabs formed by a plurality of radial slots in the hollow cylindrical insert generally at the location of the external circumferential slot, the tabs sufficiently flexible to permit snap-in placement of the outside end of the insert into the adaptor element.

15. The apparatus of claim 1 wherein the hollow cylindrical adaptor element further comprises an internal circumferential shelf and the hollow cylindrical insert further comprises an external circumferential set ring positioned in a groove on an outside end of the insert, and the attachment of the insert to the adaptor element in loose association comprises positioning the outside end of the insert into the adaptor element and placing the set ring in position adjacent the internal shelf, such that the circumferential set ring prevents removal of the insert from the adaptor element.

16. An apparatus for modifying an existing battery compartment in a battery powered device to allow the use of at least one battery having a configuration different from that for which the battery compartment was originally designed, the existing battery compartment having an existing compartment cap, the existing battery compartment and existing compartment cap each having existing electrical contacts as to have allowed electrical connection to a battery through the compartment cap, the existing battery compartment further having at least one existing electrical contact positioned as to have allowed electrical connection to a battery placed within the battery compartment, the apparatus comprising:

a hollow cylindrical adaptor element having a first end configured for attachment to the battery compartment and a second end configured for acceptance of the compartment cap, the hollow cylindrical adaptor element further comprising an internal circumferential ridge, the hollow cylindrical adaptor element further comprising an electrically conductive material configured to contact and electrically connect the existing electrical contacts in the existing battery compartment and existing compartment cap, the hollow cylindrical adaptor element further comprising an O-ring for sealing the attachment between the adaptor element and the battery compartment; and a hollow cylindrical insert externally sized to fit at least partially within the existing battery compartment and internally sized to receive the at least one new configuration battery, the insert further configured to attach to the adaptor element in loose association therewith, the hollow cylindrical insert farther comprising an external circumferential slot adjacent an attachment end of the insert, the attachment of the insert to the adaptor element in loose association comprising placement of the attachment end of the insert into the adaptor element such that the circumferential slot of the insert receives and retains the circumferential ridge of the adaptor element, the hollow cylindrical insert farther comprising an electrically conductive element configured to contact and electrically connect the at least one existing electrical contact of the existing battery compartment to the new configuration battery placed within the insert of the apparatus;

wherein the insert effectively extends the battery compartment to receive the new configuration battery and the adaptor element similarly extends the position of the compartment cap to accommodate the new configuration battery.

* * * * *